US006794441B2

(12) United States Patent
Hansen

(10) Patent No.: US 6,794,441 B2
(45) Date of Patent: Sep. 21, 2004

(54) DIE CUTTABLE LABEL ADHESIVE FORMULATION

(75) Inventor: David R. Hansen, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 128 days.

(21) Appl. No.: 10/321,257

(22) Filed: Dec. 17, 2002

(65) Prior Publication Data

US 2004/0116581 A1 Jun. 17, 2004

(51) Int. Cl.⁷ .............................................. C09J 153/02
(52) U.S. Cl. ....................... 524/505; 524/474; 524/484; 524/499
(58) Field of Search ................................ 524/474, 484, 524/499, 505

(56) References Cited

U.S. PATENT DOCUMENTS

| 3,078,254 A | 2/1963 | Zelinski et al. |
| 3,135,716 A | 6/1964 | Uraneck et al. |
| 3,468,972 A | 9/1969 | Hsieh |
| 3,594,452 A | 7/1971 | De La Mare et al. |
| 3,595,941 A | 7/1971 | Farrar et al. |
| 4,096,203 A | 6/1978 | St. Clair |

FOREIGN PATENT DOCUMENTS

| WO | WO 02/00805 A2 | 1/2002 |
| WO | WO 02/00806 A2 | 1/2002 |

Primary Examiner—Peter Szekely

(57) ABSTRACT

This invention is an adhesive formulation for die cuttable labels which comprises:
(a) 100 parts by weight of a styrene-isoprene-styrene block copolymer having an overall number average molecular weight of 50,000 to 450,000, a polystyrene content of 10 to 25 percent weight, and a coupling efficiency of less than 70 percent,
(b) from 5 to 30 parts by weight per 100 parts of block copolymer of polystyrene having a number average molecular weight of at least 50,000,
(c) from 120 to 200 parts by weight per 100 parts of block copolymer of a tackifying resin, and
(d) from 5 to 50 parts by weight per 100 parts of block copolymer of extending oil.

9 Claims, 1 Drawing Sheet

DIE CUTTABLE LABEL ADHESIVE FORMULATION

FIELD OF THE INVENTION

This invention relates to hot melt adhesive formulations based on styrene-diene block copolymers. More particularly, the invention relates to specific adhesive formulations for use in the production of pressure sensitive, peelable labels.

BACKGROUND OF THE INVENTION

Pressure sensitive adhesive ("PSA") adhesive labels are highly desirable for a wide variety of purposes. For instance, pages of peelable label stock are available which can be fit into standard printers to print address labels, etc. The pre-addressed labels are then peeled off and put on envelopes. There are a wide variety of uses for such labels and many varieties, sizes, and types are available commercially.

One method for producing sheets, etc. of PSA peelable labels involves providing a base sheet which is generally coated with a release coating. Release coatings are materials from which the label can be peeled away such that the adhesive is not removed from the label and retaining its adhesive properties. Thus, the label then has the capability of being adhered to another substrate.

A separate sheet of label material which can be printed or written upon is formed and a label adhesive is coated on the side of the sheet opposite to the side upon which it is intended to be printed or written upon. The label sheet is then adhered to the release coating sheet by placing the adhesive surface in contact with the release coating surface.

In one method of producing such labels, the product, which is the two sheets adhered together, is called roll label stock and the operation for producing the finished product is called label die cutting. The basic method is shown in FIG. 1. The roll label stock 1 is fed through a rotary die 2 which has several cutters 3 which produce the desired shape of the cut out 4 in the roll label stock 1. The roll label stock 1 then continues on to the stripping roller 5 which removes the matrix flagging 6 from the roll stock 1, leaving behind the die cut labels 7.

Obviously, it is important that the rotary die 2 be able to cut through the adhesive and the paper of the top layer of roll label stock 1. The adhesive must be strong enough, however, to leave the label behind on the release-coating layer 8 of roll label stock 1. Styrene-diene block copolymers have been found to be useful in such applications as the base material for the adhesive because of their desirable adhesive strength and also because of their relatively high tensile strength. However, the tensile strength of the styrene-diene block copolymers used heretofore sometimes is disadvantageous because the rotary die 2 will not completely cut through the top layer of roll label stock 1 so the labels 9 continue to stick to the cut out matrix flagging 6.

It would be highly advantageous if an adhesive formulation could be found which maintains the tack and adhesive performance of the aforementioned adhesive formulations but which has lower cohesive strength as evidenced by lower elongation at break and lower tensile at break so that the labels could be completely cut from the matrix and would remain on the release coating layer. The present invention provides such an adhesive formulation.

SUMMARY OF THE INVENTION

This invention is an adhesive formulation for die cuttable labels which comprises:
a. 100 parts by weight of a styrene-isoprene-styrene block copolymer having an overall number average molecular weight of 50,000 to 450,000, a polystyrene content of about 10 to about 25 percent weight, and a coupling efficiency of less than 70 percent,
b. from 5 to 30 parts by weight per 100 parts of block copolymer of polystyrene having a number average molecular weight of at least 50,000,
c. from 120 to 200 parts by weight per 100 parts of block copolymer of a tackifying resin, and
d. from 5 to 50 parts by weight per 100 parts of block copolymer of oil.

DETAILED DESCRIPTION OF THE INVENTION

Figure 1:
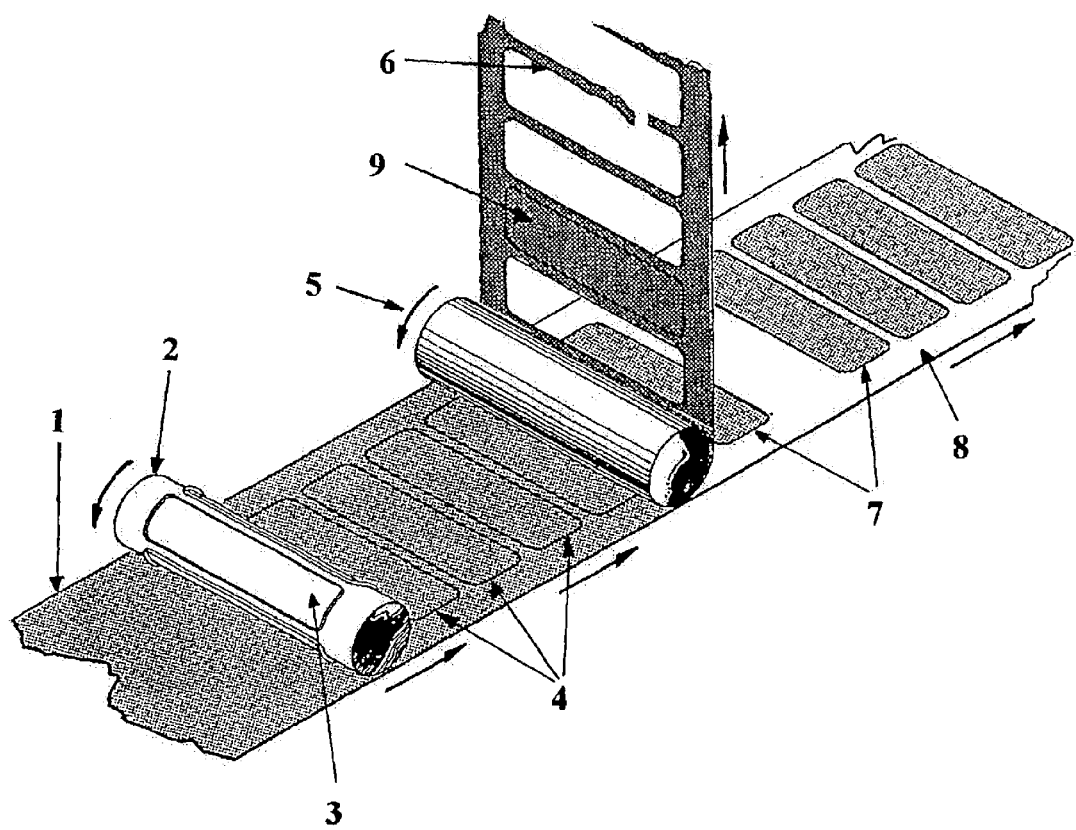
FIG. 1 is a schematic drawing of the die cuttable label process.

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear or multiarm.

Polymers of conjugated diolefins and copolymers of one or more conjugated diolefins and one or more alkenyl aromatic hydrocarbon monomers such as the present S—B—S or S—I—S or SB or SI block copolymers comprised of linear or multiarm polymeric blocks are frequently prepared in solution using anionic polymerization techniques. In general, when solution anionic techniques are used, these S—B—S or S—I—S block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to 100° C. Particularly effective anionic polymerization initiators are organolithium compounds having the general formula:

$$RLi_n$$

wherein:
R is an aliphatic, cycloaliphatic, aromatic or alkyl-substituted aromatic hydrocarbon having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; and linear and cyclic ethers such as methyl ether, methyl ethyl ether, tetrahydrofuran and the like.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A—B—Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, silanes and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972, 3,135,716; 3,078,254, and 3,594,452, the disclosures of which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_n BA$. Other useful coupling agents include tetra-alkoxy silanes, such as tetra-ethoxy silane and epoxy silanes, such as gamma-glycidoxypropyl-trimethoxy silane.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. Lower coupling efficiencies are desired herein. Coupling efficiency is defined as the weight of molecules of coupled polymer divided by the weight of molecules of coupled polymer plus the weight of molecules of uncoupled polymer. Thus, when producing, for example, an SIS linear polymer, the coupling efficiency is shown by the following relationship:

$$\frac{\text{wt of molecules of SIS}}{\text{wt of molecules of SIS plus SI}}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differing coupling efficiency. For example, if a 60% efficiency is desired, then polymers from processes having an 80% efficiency and a 40% efficiency may be blended together or a 100% triblock may be blended with a 100% diblock in a 60:40 ratio.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 90° C., thermal termination of many of the living polymer groups (A—B—Li) occurs prior to coupling. The typical coupling conditions include a temperature of between about 65° C. and about 75° C.

Following the coupling reaction or when the desired coupling efficiency has been obtained, the product is neutralized such as by the addition of terminators, e.g., hydrogen, water, alcohol or other reagents, for the purpose of terminating any residual unreacted lithium anions. The product is then recovered such as by coagulation utilizing hot water or steam or both.

The die cuttable label adhesive formulation of the present invention as comprised of a styrene-isoprene-styrene block copolymer which has been made by the above-described coupling process. The polymer must have a coupling efficiency of less than 70 percent because this helps lower the tensile strength of the adhesive while maintaining the tack and adhesive performance. It is preferred that the coupling efficiency of the polymer be from 25 to 55 percent because it is in this range that the best balance of these properties is achieved.

Based on a formulation containing 100 parts by weight of the above-described S—I—S block copolymer, the adhesive formulation of the present invention will contain from 5 to 30 parts by weight of polystyrene having a number average molecular weight of at least 50,000. The preferred molecular weight range is 50,000 to 150,000. Lower molecular weight polystyrene may not be used because such polystyrene will gravitate to the polystyrene domains of the S—I—S block copolymer and strengthen the block copolymer. The higher molecular weight polystyrenes are more compatible with the polyisoprene midblock and thus will help to weaken the cohesive strength of the adhesive formulation as desired.

The third component of the adhesive formulation is a tackifying resin, which must be present in an amount of 120 to 200 parts by weight per 100 parts of block copolymer. The best performance is achieved in a range of 140 to 175 parts by weight. In a preferred embodiment the tackifying resin is an aliphatic tackifying resin. This is because an aliphatic tackifying resin will remain in the midblock (polyisoprene) domains of the block copolymer and not go into the polystyrene domains, which would have the effect of strengthening the adhesive.

Aliphatic tackifying resins for use in adhesive formulations are well known. A common tackifying resin is a diene-olefin copolymer of piperylene and 2-methyl-2-butene having a softening point of about 95° C. This resin is available commercially under the tradename Wingtack® 95 and is prepared by the cationic polymerization of 60 percent piperylene, 10 percent isoprene, 5 percent cyclopentadiene, 15 percent 2-methyl-2-butene, and about 10 percent dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 150° C. Other tackifying resins which can be used include Escorez® resins, which are based on piperylene, Regalrez® and Regalite® resins, which are based on hydrogenated dicycolpentadiene and C9 resins.

The fourth component of the adhesive formulation of the present invention is oil. It should be present in an amount from 10 to 50 parts by weight per 100 parts of block copolymer. Rubber compounding oils are well known in the art and include both high saturates content oils and naphthenic oils. Preferred plasticizer oils are highly saturated oils, e.g., Tufflo® 6056 and 6204 oil made by Arco and naphthenic process oils, e.g., Shellflex® 371 and 6371 oil made by Shell Chemical Company. The preferred amount of oil is 20 to 30 parts by weight so as to obtain the appropriate glass transition temperature and tack.

While the applicant does not wish to be bound by this theory, he does believe that the present invention is successful because the low coupling efficiency S—I—S polymer provides aggressive tack and the adhesive properties necessary to the formulation. The polystyrene weakens the cohesive strength of the adhesive formulation in terms of tensile strength and cohesive strength such that the adhesive formulation is not so strong that the labels will continue to stick to the cut out matrix. The aliphatic tackifying resin contributes positively to both of the aforesaid characteristics and the oil helps to obtain the appropriate glass transition temperature and tack.

These adhesive formulations can be made by the typical hot melt mixing process, e.g. using a sigma blade mixer. The compositions of the present invention may be modified further with the addition of other antioxidants and stabilizers without departing from the scope of this invention.

EXAMPLES

A number of different S—I—S block copolymers, polystyrenes, SEBS block copolymers, and tackifying resins were used in combination with oil to make adhesive formulations for testing herein. The materials which were used in these experiments are listed in Table 1. Zonatac® 105 resin is a styrenated terpene resin (aromatic) and Wingtack® 95 resin is diene-olefin copolymer of piperylene and 2-methyl-2-butene (aliphatic).

The tensile, adhesive, and process properties of these formulations were measured. The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (0.5, 1, or 2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

The results are recorded in Tables 2 and 3. Adhesive Mixes L and O are according to the present invention, with O being preferred. As shown in Table 3, Adhesive O made with Wingtack 95, has a reasonable tack, with much lower and appropriate tensile properties, which would be useful in peelable PSA.

TABLE 1

| Polymer | Type | Styrene Content (%) | Coupling Efficiency (%) |
|---|---|---|---|
| 1 | S-I-S | 22 | 35 |
| 2 | S-I-S | 22 | 25 |
| 3 | S-I-S | 22 | 82 |
| 4 | S-B-S | 31 | 20 |
| 5 | S-EB-S | 13 | 70 |
| 6 | S-EB-S | 31 | 30 |
| Polystyrene DP-210 (100,000 MW) | | 100 | |
| Polystyrene Piccolastic A75 Hercules lot #F21J5461 (670 MW) | | 100 | |

Resins

Zonatac 105, Arizona Chemical

Wingtack 95, Goodyear Chemicals, (WT95)

Oil

Shellflex 371, Shell (SF 371)

Antioxidant

Irganox 1010, Ciba Geigy (I 1010)

Polystyrene, DP-210, Huntsman Chemical

Piccolastic A75 is a low molecular weight polystryrene having a mol weight of about 1,350

Polymer 3 is KRATON® D 1111; Polymer 4 is KRATON® D1118; Polymer 5 is KRATON® G 1657; and Polymer 6 is KRATON® G 1726, all available from KRATON Polymers

TABLE 2

ADHESIVE MIXES

| Relative compositions (phr) | A | B | C | D | E | F | H | I | J |
|---|---|---|---|---|---|---|---|---|---|
| Polymer 1 | 100 | 80 | 100 | 80 | 80 | 90 | | | |
| Polymer 2 | | | | | | | | | 100 |
| Polymer 3 | | | | | | | 100 | 100 | |
| Polymer 4 | | 20 | | | | | | | |
| Polymer 5 | | | | 20 | | | | | |
| Polymer 6 | | | | | 20 | 10 | | | |
| Polystyrene (DP-210) (100000 Mw) | | | | | | | | | |
| Polystyrene (Piccolastic A75) | | | | | | | | | |
| Polyethylene | | | | | | | | | |
| Polypropylene | | | | | | | | | |
| WT95 | | | 140 | 140 | 140 | 140 | 140 | | 140 |
| Zonatac 105 | 140 | 140 | | | | | | 140 | |
| SF 371 | 30 | 30 | 30 | 30 | 30 | 30 | 30 | 30 | 30 |
| I 1010 | 2 | 2 | 2 | 2 | 2 | 2 | 2 | 2 | 2 |
| PROPERTIES | | | | | | | | | |
| 1. Tensile properties 10"/min | | | | | | | | | |
| Tensile at break (psi) | 215 | 170 | 90 | 84 | 79 | 80 | 570 | 544 | 20.3 |
| Elongation at break (%) | 2000 | 2475 | 2460 | 2175 | 2460 | 2400 | 1550 | 1390 | 4500 |
| Max tensile strength (psi) | 220 | 185 | 136 | 137 | 127 | 130 | 578 | >544 | 83 |
| 10"/min with nick | | | | | | | | | |
| Tensile at break (psi) | 180 | 167 | 110 | 118 | 80 | 98 | | | 73 |
| Elongation at break (%) | 1875 | 2200 | 1840 | 1740 | 1850 | 2360 | | | 2325 |
| Max tensile strength (psi) | 180 | 167 | 116 | 121 | 114 | 133 | | | 88 |

TABLE 2-continued

| Relative compositions (phr) | ADHESIVE MIXES | | | | | | | | |
|---|---|---|---|---|---|---|---|---|---|
| | A | B | C | D | E | F | H | I | J |
| 2"min | | | | | | | | | |
| Tensile at break (psi) | 123 | 53 | 45 | 48 | | | | | |
| Elongation at break (%) | 2325 | 3675 | 2260 | 2480 | | | | | |
| Max tensile strength (psi) | 167 | 140 | 107 | 98 | | | | | |
| 50"/min | | | | | | | | | |
| Tensile at break (psi) | | | | | | | 688 | 486 | 77 |
| Elongation at break (%) | | | | | | | 1480 | 1260 | 2860 |
| Max tensile strength (psi) | | | | | | | 688 | 486 | 119 |
| 2. Adhesive properties | | | | | | | | | |
| Rollingball (cm) | >21 | | 17.1 | | | | | | 14.8 |
| Polyken probe (grams) | 1047 | | 1938 | | | | | | 1646 |
| Loop tack (oz/in) | 81.5 | | 106.0 | | | | | | 97.0 |
| 180 peel (pli)/failure mode | 4.45/coh. | | 3.7/coh. | | | | | | 3.45/coh. |
| HP/kraft with 1/2 kg (min)/mode | >5000/adh. | | >9000/adh. | | | | | | |
| HP/kraft with 1 kg (min)/mode | | | | | | | | | 37.3/adh. |
| HP/steel with 1 kg (min)/mode | >10000 | | >10000 | | | | | | >7000/coh |
| SAFT/kraft with 1 kg (C)/mode | 50.8/adh. | | 48.25/adh. | | | | | | 43.5/adh. |
| SAFT/mylar with 1 kg (C)/mode | 67/coh. | | 79/coh. | | | | | | 69/coh. |
| Film thickness (microns) | 22 | | 23 | | | | | | 24 |
| 3. Process properties | | | | | | | | | |
| Melt viscosity (cps) | 9900 | | 900000 | | | | 1720000 | | 430000 | adh = adhesive failure
coh = cohesive failure

TABLE 3

| Relative compositions (phr) | ADHESIVE MIXES | | | | | |
|---|---|---|---|---|---|---|
| | K | L | M | N | O | P |
| Polymer 1 | | 80 | 80 | 80 | 80 | 90 |
| Polymer 2 | 100 | | | | | |
| Polymer 3 | | | | | | |
| Polymer 4 | | | | | | |
| Polymer 5 | | | | | | |
| Polymer 6 | | | | | | |
| Polystyrene (DP-210) (100000 Mw) | | 20 | | | 20 | |
| Polystyrene (Piccolastic A75) | | | | | | 10 |
| Polyethylene | | | 20 | | | |
| Polypropylene | | | | 20 | | |
| WT95 | | | | | 140 | 140 |
| Zonatac 105 | 140 | 140 | 140 | 140 | | |
| SF 371 | 30 | 30 | 30 | 30 | 30 | 30 |
| 11010 | 2 | 2 | 2 | 2 | 2 | 2 |
| PROPERTIES | | | | | | |
| 1. Tensile properties | | | | | | |
| 10"/min | | | | | | |
| Tensile at break (psi) | 77 | 180 | 195 | | 43 | 175 |
| Elongation at break (%) | 3320 | 1800 | 1820 | | 3050 | 2300 |
| Max tensile strength (psi) | 128 | >180 | 195 | | 110 | 199 |
| 10"/min with nick | | | | | | |
| Tensile at break (psi) | | | | | | 177 |
| Elongation at break (%) | | | | | | 1750 |
| Max tensile strength (psi) | | | | | | 179 |
| 50"/min | | | | | | |
| Tensile at break (psi) | 179 | 258 | 264 | | 84 | |
| Elongation at break (%) | 2440 | 2150 | 1940 | | 2800 | |
| Max tensile strength (psi) | 192 | 267 | >264 | | 159 | |
| 2. Adhesive properties | | | | | | |
| Rollingball (cm) | | | | | >28 | |
| Polyken probe (grams) | | | | | 443 | |

TABLE 3-continued

| | ADHESIVE MIXES | | | | | |
|---|---|---|---|---|---|---|
| Relative compositions (phr) | K | L | M | N | O | P |
| Loop tack (oz/in) | | | | | 7.0 | |
| 180 peel (pli)/failure mode | | | | | 3.6/coh. | |
| HP/kraft with 1/2 kg (min)/mode | | | | | | |
| HP/kraft with 1 kg (min)/mode | | | | | 4.7/adh. | |
| HP/steel with 1 kg (min)/mode | | | | | 490.9/coh. | |
| SAFT/kraft with 1 kg (C)/mode | | | | | 33/adh. | |
| SAFT/mylar with 1 kg (C)/mode | | | | | 45.5/coh. | |
| Film thickness (mils) | | | | | 28 | |
| 3. Process properties | | | | | | |
| Melt viscosity (cps) | | | | | 816000 | |

What is claimed is:

1. An adhesive formulation for die cuttable labels which comprises:
    a. 100 parts by weight of a styrene-isoprene-styrene block copolymer having an overall number average molecular weight of 50,000 to 450,000, a polystyrene content of 10 to 25% wt, and a coupling efficiency of less than 70%,
    b. from 5 to 30 parts by weight of polystyrene having a number average molecular weight of at least 50,000,
    c. from 120 to 200 parts by weight of a tackifying resin, and
    d. from 5 to 50 parts by weight of oil.

2. The formulation of claim 1 wherein the coupling efficiency of the block copolymer is from 25% to 55% wt.

3. The formulation of claim 2 wherein the polystyrene molecular weight is 50,000 to 150,000.

4. The formulation of claim 3 wherein the tackifying resin is present in an amount of 140 to 175 parts by weight.

5. The formulation of claim 4 wherein the oil is present in an amount of 20 to 30 parts by weight.

6. The formulation of claim 1 wherein said tackifying resin is an aliphatic tackifying resin.

7. The formulation of claim 6 wherein said aliphatic tackifying resin is a copolymer of piperylene and an olefin.

8. The formulation of claim 7 wherein said aliphatic tackifying resin is a piperylene and 2-methyl-2-butene having a softening point of about 95 degrees C.

9. The formulation of claim 1 wherein said tackifying resin is an aromatic modified tackifying resin.

* * * * *